United States Patent
Murakami

(10) Patent No.: US 10,359,624 B2
(45) Date of Patent: Jul. 23, 2019

(54) GALVANOSCANNER

(71) Applicant: FANUC CORPORATION, Yamanashi (JP)

(72) Inventor: Yoshinori Murakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 155 days.

(21) Appl. No.: 15/696,252

(22) Filed: Sep. 6, 2017

(65) Prior Publication Data

US 2018/0074312 A1 Mar. 15, 2018

(30) Foreign Application Priority Data

Sep. 9, 2016 (JP) .................................. 2016-176890

(51) Int. Cl.
*G02B 26/08* (2006.01)
*G02B 26/10* (2006.01)
(Continued)

(52) U.S. Cl.
CPC .......... *G02B 26/101* (2013.01); *B23K 26/082* (2015.10); *B23K 26/21* (2015.10); *G02B 26/0816* (2013.01); *G02B 26/108* (2013.01)

(58) Field of Classification Search
CPC G02B 26/101; G02B 26/0816; G02B 26/108; G02B 26/12; B23K 26/082; B23K 26/21; B23K 26/70
(Continued)

(56) References Cited

U.S. PATENT DOCUMENTS 5,841,097 A 11/1998 Esaka et al.
6,201,211 B1 3/2001 Emmelmann
(Continued)

FOREIGN PATENT DOCUMENTS

JP H09-174266 A 7/1997
JP 2000-516147 A 12/2000
(Continued)

OTHER PUBLICATIONS

An Office Action mailed by the Japanese Patent Office dated Jun. 19, 2018, which corresponds to Japanese Patent Application No. 2016-176890 and is related to U.S. Appl. No. 15/696,252.

*Primary Examiner* — Euncha P Cherry
(74) *Attorney, Agent, or Firm* — Studebaker & Brackett PC

(57) ABSTRACT

To provide a galvanoscanner enabling execution of weaving welding whereby favorable weld quality is easily obtained. A galvanoscanner (50) includes: two galvano mirror (51, 52) that is configured to be rotatable about a rotation axis (X1, X2), and reflects a laser beam (L); a galvano motor (54, 54) that rotationally drives the galvano mirror (51, 52); an optical component (2) that is arranged so that the laser beam (L) incident on the galvano mirror (51, 52) is incident in a thickness direction (T), is configured to be rotatable about a rotating shaft (20), and has a refractive index that differs from a surrounding; and a rotary motor (4) that rotationally drives the optical component (2), in which the optical component (2) is arranged so that, in a cross section (C) in a thickness (T) direction, an incident side (21) and an emission side (22) are parallel to each other, and the incident side (21) is sloped relative to an optical axis (L1) of the laser beam (L) that is incident, and thickness (T) thereof continuously varies along a rotation direction.

8 Claims, 13 Drawing Sheets

(51) Int. Cl.
*B23K 26/082* (2014.01)
*B23K 26/21* (2014.01)

(58) Field of Classification Search
USPC ..................................................... 359/201.2
See application file for complete search history.

(56) References Cited

U.S. PATENT DOCUMENTS 6,353,203 B1 * 3/2002 Hokodate ............ B23K 26/032
219/121.67
2017/0361401 A1   12/2017 Estival et al.

FOREIGN PATENT DOCUMENTS

| JP | 2001-225183 A | 8/2001 |
| JP | 2002-178182 A | 6/2002 |
| JP | 2012-17231 A | 1/2012 |

* cited by examiner

GALVANOSCANNER

This application is based on and claims the benefit of priority from Japanese Patent Application No. 2016-176890, filed on 9 Sep. 2016, the content of which is incorporated herein by reference.

BACKGROUND OF THE INVENTION

Field of the Invention

The present invention relates to a galvanoscanner.

Related Art

Conventionally, a laser welding device including a laser head having a galvanoscanner at the leading end of an arm of a multi-axis robot has been known. Herein, galvanoscanner is a device including two mirrors which are rotatable about two rotation axes orthogonal to each other, respectively, and scans a laser beam emitted from a laser light source by rotationally driving these mirrors by servomotors.

However, in the butt-welding, etc. of workpieces, for example, there are cases requiring a large weld width. In contrast, when enlarging the beam diameter of a laser beam, the favorable weld quality is no longer obtained due to the energy density of the laser beam declining. Therefore, weaving welding which secures the weld width by oscillating a laser beam having a small beam diameter at high speed in a direction straddling the butt-welded part is performed, by way of controlling the angles of the Galvano mirrors at high speed.

Patent Document 1: Japanese Unexamined Patent Application, Publication No. H09-174266

SUMMARY OF THE INVENTION

However, in weaving welding, a control cycle of at least several hundred Hz is generally required. For this reason, in the weaving welding by way of the control of galvano mirrors as is conventionally, favorable weld quality has not been easily obtained.

The present invention has been made taking account of the above, and an object thereof is to provide a galvanoscanner enabling execution of weaving welding whereby favorable weld quality is easily obtained.

In order to achieve the above-mentioned object, a first aspect of the present invention provides a galvanoscanner (e.g., the galvanoscanner 50, 50A, 50B, 50C, 50D described later) that scans a laser beam (e.g., the laser beam L described later), including: at least one galvano mirror (e.g., the Galvano mirror 51, 52 described later) that is configured to be rotatable about a rotation axis (e.g., the rotation axis X1, X2 described later), and reflects a laser beam; a galvano motor (e.g., the galvano motor 54, 54 described later) that rotationally drives the galvano mirror; an optical component (e.g., the optical component 2, 2A, 2B described later) that is arranged so that the laser beam incident on the galvano mirror is incident in a thickness (e.g., the thickness T described later) direction, is configured to be rotatable about a rotating shaft (e.g., the rotating shaft 20 described later), and has a refractive index that differs from a surrounding; and a rotary motor (e.g., the rotary motor 4 described later) that rotationally drives the optical component, in which the optical component is arranged so that, in a cross section (e.g., the cross section C described later) in a thickness direction, a region on an incident side (e.g., the incident side 21 described later) and a region on an emission side (e.g., the emission side 22 described later) are parallel to each other, and the region on the incident side is sloped relative to an optical axis (e.g., the optical axis L1 described later) of the laser beam that is incident, and thickness thereof continuously varies along a rotation direction.

According to a second aspect of the present invention, in the galvanoscanner as described in the first aspect, the optical component may be configured by an optical component group (e.g., the optical component group 12 described later) consisting of a plurality of optical components containing at least one optical component having a thickness that continuously varies along the rotation direction, and configured to be rotatable about a rotating shaft by way of the rotary motor, and the optical component group may have, in a cross section in the thickness direction, a region of an initial incident side (e.g., the first incident side 121 described later) and a region of a final emission side (e.g., the final emission side 122 described later) that are parallel to each other.

According to a third aspect of the present invention, the galvanoscanner as described in the first or second aspect may further include a rotation mechanism (e.g., the rotation mechanism 6 described later) establishing as variable a slope angle of the region of the incident side and the region of the emission side relative to the optical axis of the laser beam that is incident, by causing the optical component and the rotary motor to rotate integrally, about a rotating shaft (e.g., the rotating shaft 60 described later) perpendicular relative to a plane including the rotation axis of the optical component as well as including the optical axis of the laser beam.

According to a fourth aspect of the present invention, the galvanoscanner as described in any one of the first to third aspects may further include a transfer mechanism (e.g., the transfer mechanism 8 described later) establishing an incident position (e.g., the incident position P described later) of the laser beam as variable relative to the optical component, by causing the optical component and the rotary motor to move integrally, in a planar direction perpendicular to the rotation axis of the optical component.

According to the present invention, it is possible to provide a galvanoscanner enabling execution of weaving welding whereby favorable weld quality is easily obtained.

DETAILED DESCRIPTION OF THE INVENTION

Hereinafter, embodiments of the present invention will be explained by referencing the drawings. It should be noted that, in the explanations of the second embodiment and later, the same reference symbols will be assigned for configurations shared with the first embodiment, and explanations thereof will be omitted.

(First Embodiment)

Figure 1:
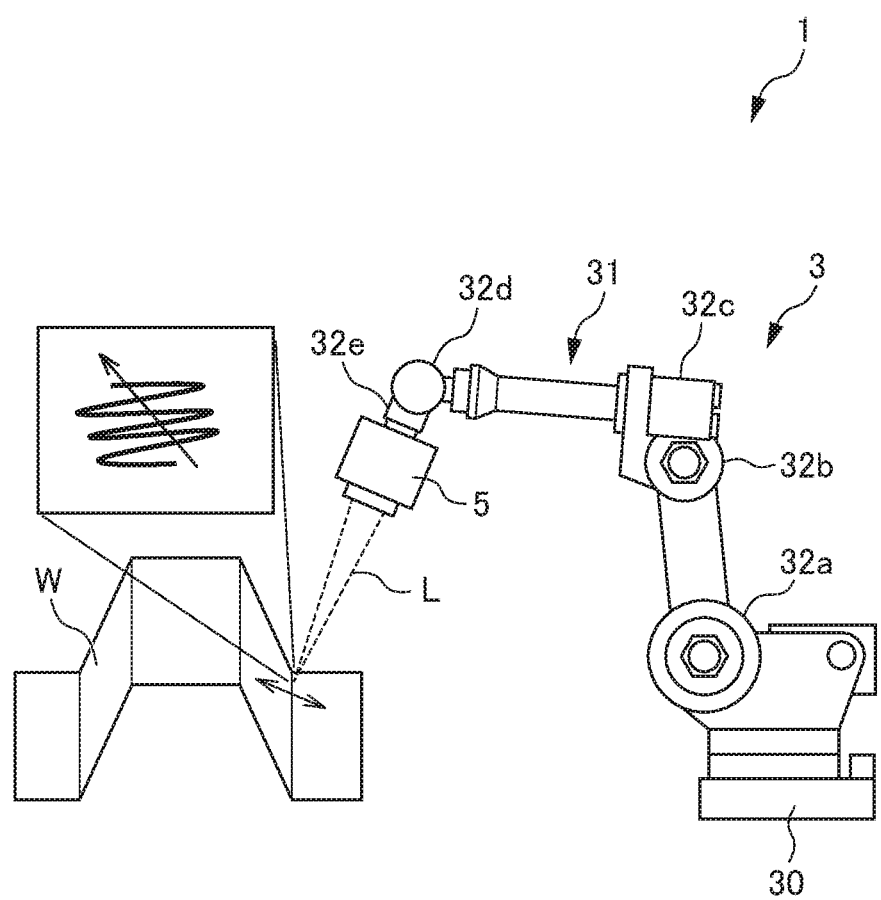
FIG. 1 is an exterior view of a remote laser welding system according to a first embodiment.

FIG. 1 is an exterior view of a remote laser welding system 1 according to a first embodiment. As shown in FIG. 1, the remote laser welding system 1 according to the present embodiment includes a multi-axis robot 3, a laser light source described later, and a laser head 5 provided to a leading end of an arm 31 of the multi-axis robot 3. This remote laser welding system 1 executes weaving welding by conveying the laser head 5 at the leading end of the arm 31 according to operations of the multi-axis robot 3, and irradiating, while oscillating, the laser beam L from the laser head 5 towards a butting processing point (butt-welding point) of a workpiece W such as an automobile body.

The multi-axis robot 3 includes a base 30, the arm 31, a plurality of axes 32a to 32e, and robot motors (not illustrated) consisting of servomotors that drive each axes. For the multi-axis robot 3, the operation thereof is controlled by a robot control unit (not illustrated).

The laser head 5 includes a galvanoscanner 50 for scanning the laser beam L towards the butting processing point (butt-welding point) of the workpiece W. For the galvanometer 50, the operation thereof is controlled by a galvanoscanner control unit described later.

Figure 2:
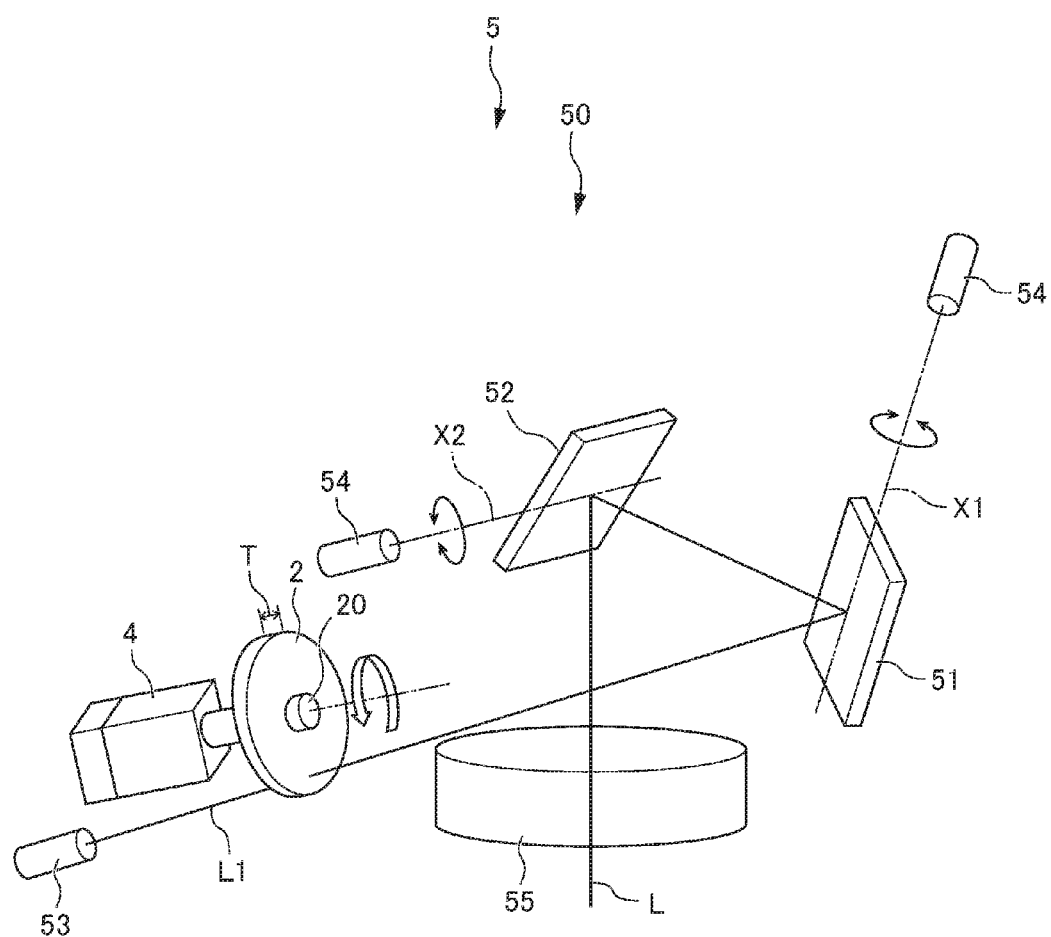
FIG. 2 is a view showing the optical system of the remote laser welding system according to the first embodiment.

FIG. 2 is a view showing the optical system of the remote laser welding system 1. FIG. 2 schematically shows the galvanoscanner 50. As shown in FIG. 2, the optical system of the remote laser welding system 1 includes the laser light source 53 and the galvanoscanner 50.

The laser light source 53 is configured by various laser oscillators including a laser medium, optical resonator, excitation source, etc. The laser light source 53 generates the laser beam L, and emits the generated laser beam L towards the galvanoscanner 50 described later.

The galvanoscanner 50 includes the two galvano mirrors 51, 52 to which the laser beam L emitted by the laser light source 53 is reflected in order; the two galvano motors 54, 54 which rotationally drive each of the galvano mirrors 51, 52 about the rotation axes X1, X2, respectively; and a glass cover 55.

The galvano mirrors 51, 52 are configured to be rotatable about the two rotation axes X1, X2, respectively, which are orthogonal to each other. The galvano motors 54, 54 are configured by servomotors, and scan the laser beam L emitted from the laser light source 53, by rotationally driving the galvano mirrors 51, 52. The glass cover 55 has a columnar shape, and has a function of protecting the galvanoscanner 50, as well as transmitting the laser beam L.

In addition, the galvanoscanner 50 according to the present embodiment includes an optical component 2, and rotary motor 4 that rotationally drives this optical component 2, as shown in FIG. 2. The optical component 2 is arranged so that the laser beam L incident on the galvano mirrors 51, 52 is incident in the thickness T direction, and is configured to be rotatable about the rotating shaft 20. The rotary motor 4 rotationally drives the optical component 2 about the rotating shaft 20, and operation thereof is controlled by the galvanoscanner control unit described later. This optical component 2 and rotary motor 4 will be described in detail at a later stage.

As shown in FIG. 2, the laser beam L emitted from the laser light source 53 first penetrates the optical component 2, and then is reflected in order by the two galvano mirrors 51, 52. Then, after penetrating the glass cover 55, is irradiated towards the butting processing point (butt-welding point) of the workpiece W. At this time, when rotationally driving the galvano mirrors 51, 52 by way of the galvano motors 54, 54, respectively, the incidence angle of the laser beam L incident on these galvano mirrors 51, 52 continuously changes. As a result thereof, the laser beam L reaching the workpiece W becomes scannable following a predetermined scanning path on the workpiece W.

Figure 3:
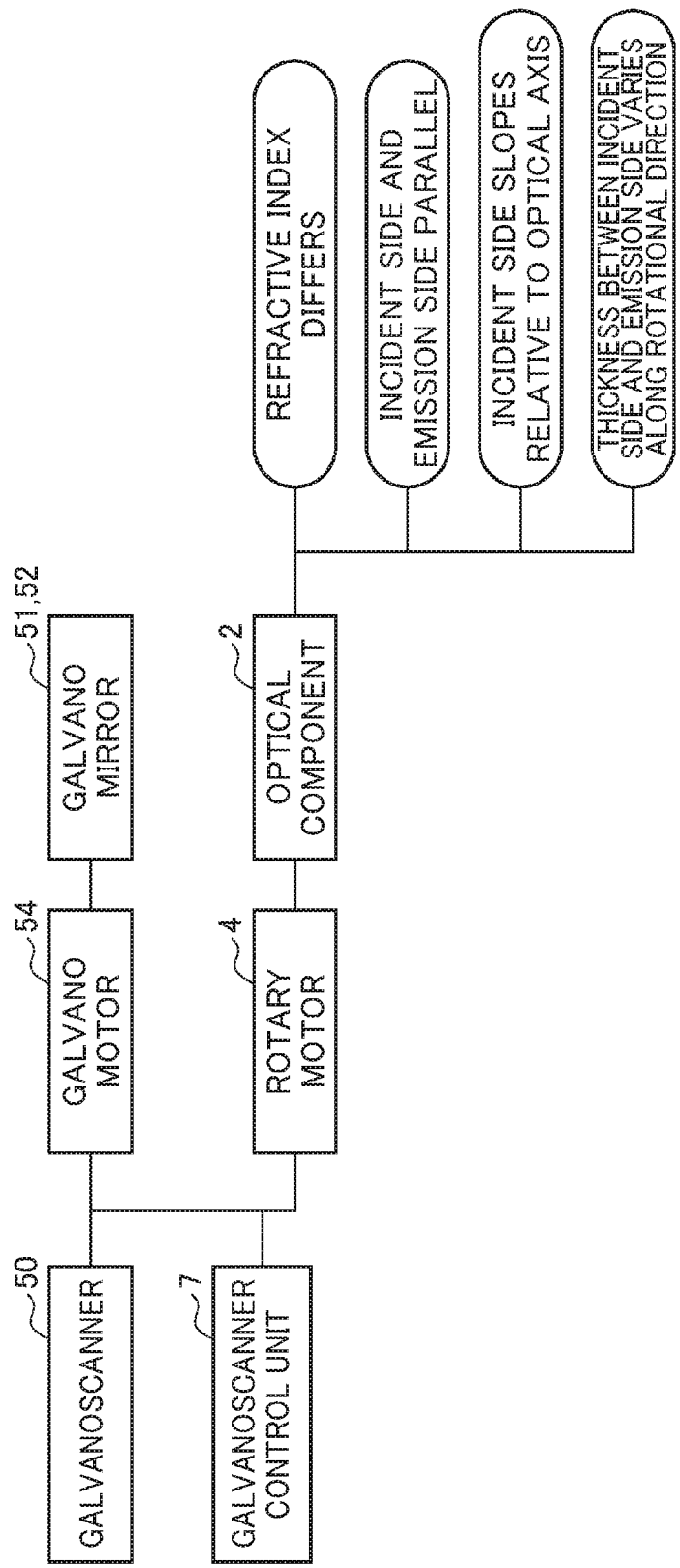
FIG. 3 is a functional block diagram of a galvanoscanner according to the first embodiment.
Figure 4A:
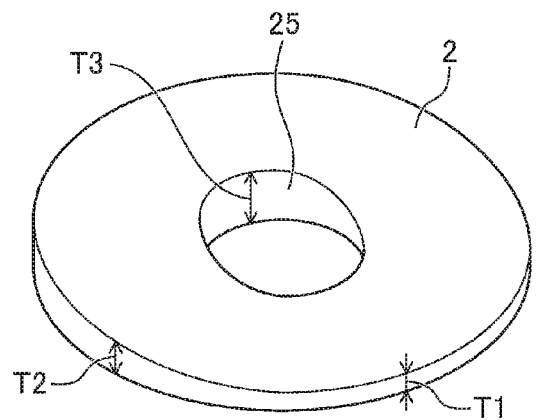
FIG. 4A is a perspective view of an optical component of the galvanoscanner according to the first embodiment.
Figure 4B:
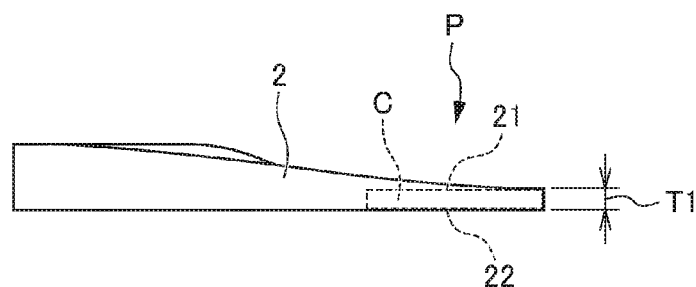
FIG. 4B is a side view showing a thickness T1 of a laser beam incident position of the optical component of the galvanoscanner according to the first embodiment.
Figure 4C:
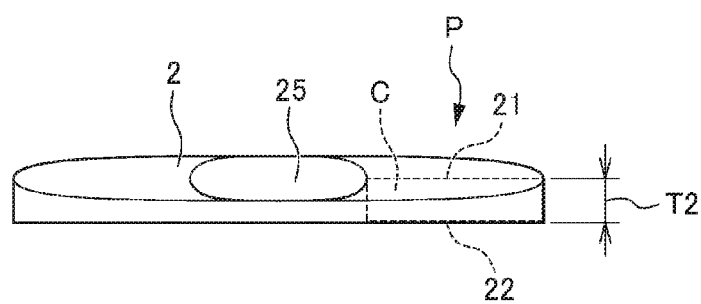
FIG. 4C is a side view showing a thickness T2 of a laser beam incident position of the optical component of the galvanoscanner according to the first embodiment.
Figure 4D:
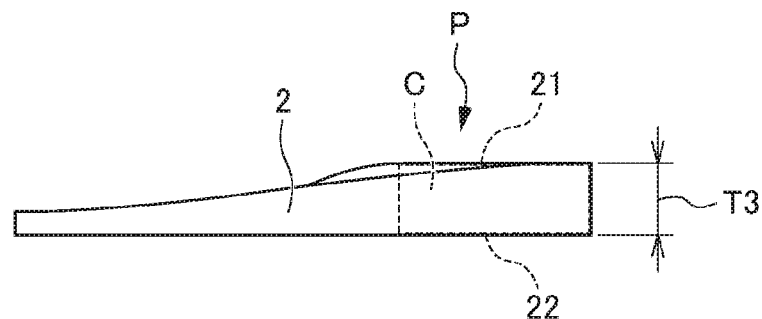
FIG. 4D is a side view showing a thickness T3 of the laser beam incident position of the optical component of the galvanoscanner according to the first embodiment.

Next, the optical component 2 and rotary motor 4 of the galvanoscanner 50 according to the present embodiment will be explained by referencing FIGS. 3 to 6. Herein, FIG. 3 is a functional block diagram of the galvanoscanner 50 according to the present embodiment. FIG. 4A is a perspective view of the optical component 2 of the galvanoscanner 50 according to the present embodiment. FIG. 4B is a side view showing the thickness T1 of an incident position P of the laser beam L on the optical component 2 of the galvanoscanner 50 according to the present embodiment. FIG. 4C is a side view showing the thickness T2 of the incident position P of the laser beam L on the optical component 2 of the galvanoscanner 50 according to the present embodiment. FIG. 4D is a side view showing the thickness T3 of the incident position P of the laser beam L on the optical component 2 of the galvanoscanner 50 according to the present embodiment.

As mentioned above, the galvanoscanner 50 as shown in FIG. 3 includes the galvano mirrors 51, 52, the galvano motors 54, 54, the optical component 2, and the rotary motor 4. For the galvano motors 54, 54 and the rotary motor 4, the respective operations are controlled by the galvanoscanner control unit 7.

Herein, the optical component 2 according to the present embodiment includes the various functions shown in FIG. 3. In other words, the optical component 2 is configured by an optical element having different refractive index from the surrounding, and is configured by a glass plate, for example. This optical component 2 has a property of emitting the laser beam L as refracted light without absorbing. The laser beam L that is incident thereby comes to be incident and refracted at the optical component 2, and is emitted as refracted light from an emission side on an opposite side to the incident side.

In addition, as shown in FIGS. 4A to 4D, the optical component 2 is formed in a ring shape, for example, in which a region on the incident side in a cross-section C in the thickness T direction thereof (hereinafter referred to as incident side) 21, and a region on the emission side (hereinafter referred to as emission side) 22 are parallel to each other.

In addition, the optical component 2 is arranged so that the incident side 21 is sloped relative to an optical axis L1 of the laser beam L that is incident (refer to FIG. 6 described later). In the present embodiment, the rotating shaft 20 of the rotary motor 4 is also arranged to be similarly sloped relative to the optical axis L1.

In addition, in the optical component 2, the thickness T in the circumferential direction thereof continuously varies. On the other hand, the thickness T in the radial direction thereof is constant without varying. The rotating shaft 20 of the rotary motor 4 is inserted into the hole 25 in the center of the optical component 2 to be fixed. The optical component 2 is thereby rotationally driven, and the thickness T comes to continuously vary along the rotational direction thereof. More specifically, the thickness T of the optical component 2 can assume thicknesses represented by T1~T2~T3, for example, and these are in the relationship of T1<T2<T3, as shown in FIGS. 4A to 4D.

Figure 5:
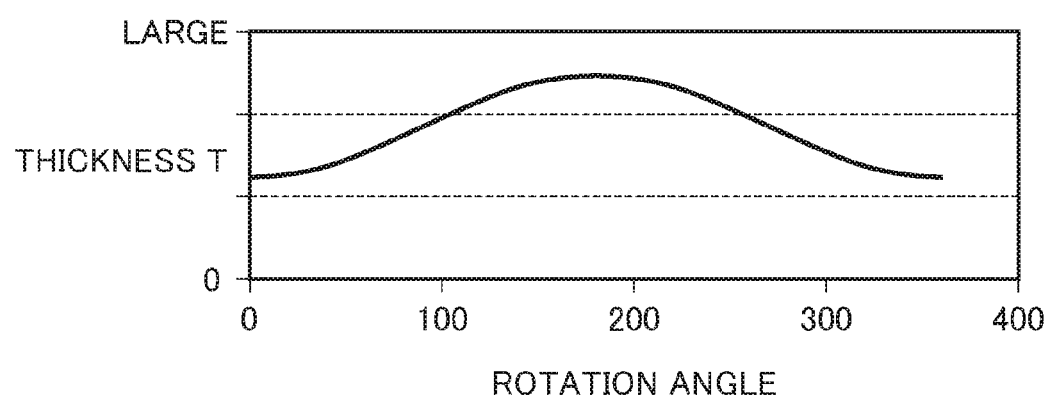
FIG. 5 is a graph showing the relationship between the rotation angle and thickness of the optical component of the galvanoscanner according to the first embodiment.

Herein, FIG. 5 is a view showing the relationship between the rotation angle and thickness T of the optical component 2 of the galvanoscanner 50 according to the present embodiment. As shown in FIG. 5, the thickness T of the optical component 2 varies continuously and periodically according to the rotation angle when being rotationally driven by the rotary motor 4. It is thereby confirmed that the optical component 2 continuously varies in the thickness T along the rotational direction thereof.

Figure 6:
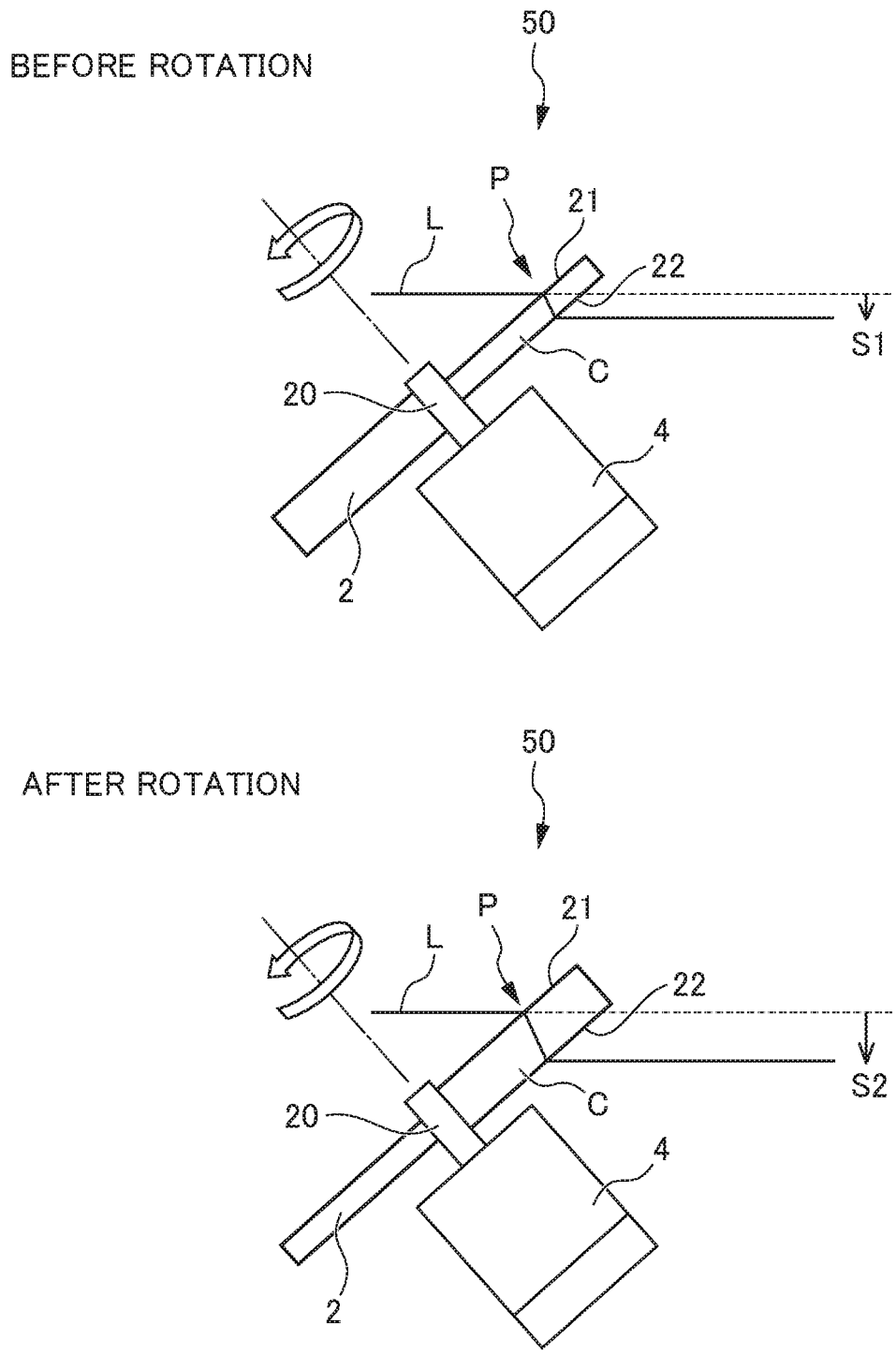
FIG. 6 is a view showing an aspect of the laser beam incident on the optical component of the galvanoscanner according to the first embodiment refracting.

In addition, FIG. 6 is a view showing an aspect of the laser beam L incident on the optical component 2 of the galvanoscanner 50 according to the present embodiment refracting. In more detail, FIG. 6 shows an aspect of refraction of the laser beam L at the optical component 2 before and after rotation. As shown in FIG. 6, the laser beam L incident on the optical component 2 refracts according to the refraction index of the optical component 2, and is emitted as refracted light.

At this time, the beam position of the laser beam L shifting according to refraction has a correlation with the thickness T of the optical component 2. In other words, the shift amount which is the divergence of the beam position of the laser beam L according to refraction becomes larger with greater thickness T of the optical component 2 at the incident position P of the laser beam L. More specifically, as shown in FIG. 6, a shift amount S2 of the beam position of the laser beam L after rotation is greater than a shift amount S1 of the beam position of the laser beam L prior to rotation. These shift amounts correspond to the amplitude of oscillation of the laser beam L.

The present embodiment uses this characteristic, and causes the beam position of the laser beam L, i.e. irradiation position of the laser beam L, to continuously and periodically vary by causing the laser beam L to penetrate the optical component 2 in which the thickness T continuously and periodically varies in the rotational direction. In the present embodiment, it is thereby possible to cause the laser beam L to smoothly oscillate, whereby weaving welding becomes possible.

According to the galvanoscanner 50 including the above configuration, there following effects are exerted. The present embodiment arranges the optical component 2 having a different refractive from the surroundings so that the laser beam L incident on the galvano mirrors 51, 52 is incident in the thickness T direction thereof, and provides the rotary motor 4 which rotationally drives this optical component 2. In addition, the optical component 2 is configured so that the incident side 21 and emission side 22 of the cross-section C in the thickness T direction are parallel to each other, and arranges so that the incident side 21 slopes relative to the optical axis L1 of the incident laser beam L, as well as the thickness T thereof continuously varying along the rotational direction.

By causing the laser beam L to penetrate the optical component 2 for which the thickness T continuously and periodically varies in the rotational direction, it is thereby possible to make the beam position of the laser beam L, i.e. irradiation position of the laser beam L, to continuously and periodically vary. In other words, it is possible to cause the laser beam L to smoothly oscillate, whereby weaving welding is possible.

Therefore, according to the present embodiment, it is possible to realize weaving welding in which favorable weld quality is obtained easily by simply rotationally driving the optical component 2 by way of the rotary motor 4. In other words, by simply controlling the rotation of the rotary motor 4 for weaving welding, control is easy, without requiring to raise the control cycle of the galvano mirrors 51, 52 as is conventionally. In addition, by simply adding the optical component 2 and the rotating shaft 20 of the rotary motor 4 to the optical system as an additional axis, for example, the modification to a complex optical system such that adds a resonant mirror is unnecessary, and the optical system can be simplified. For this reason, the attachment or removal of such an additional axis is simple.

(Second Embodiment)

Figure 7:
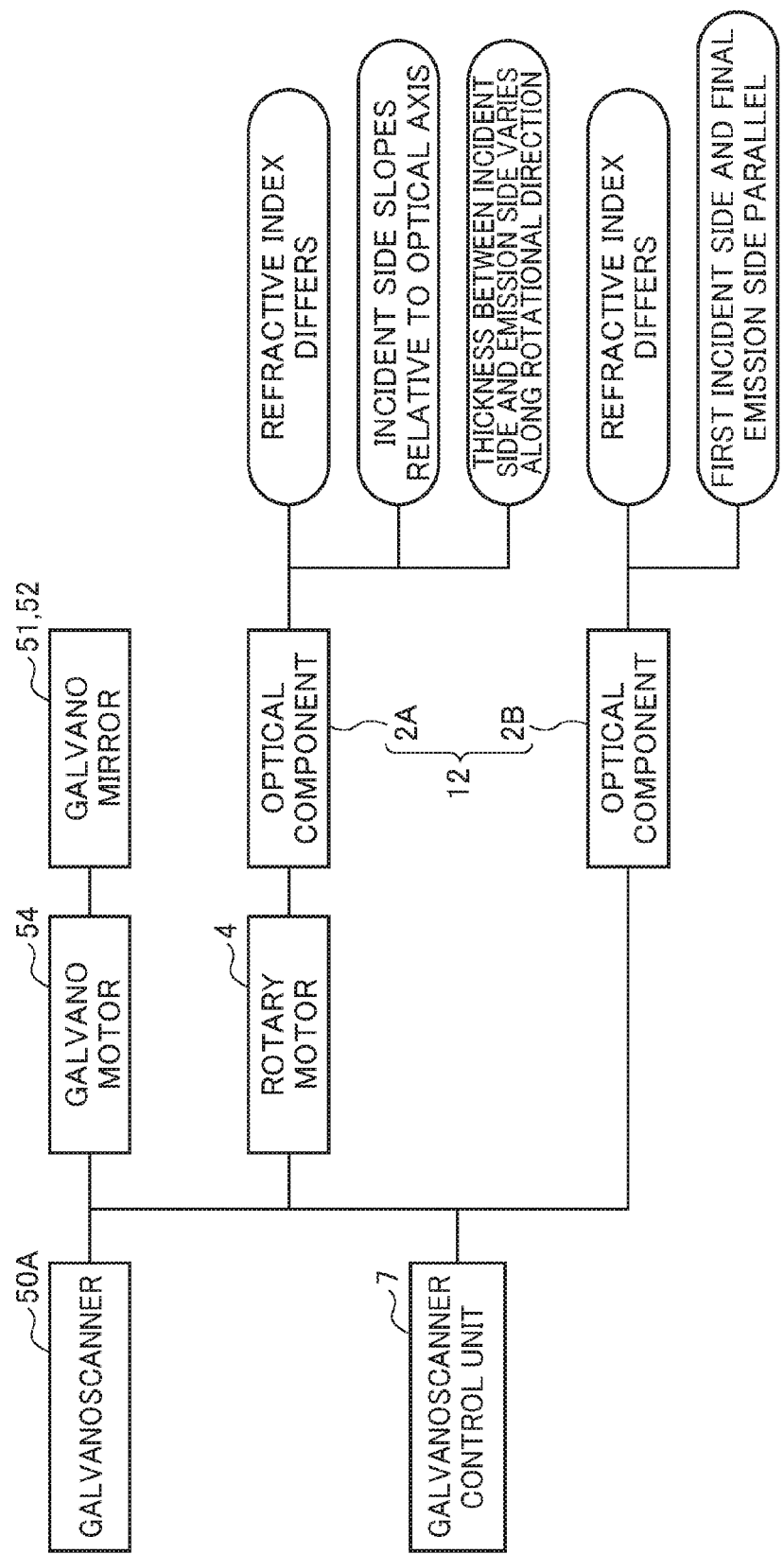
FIG. 7 is a functional block diagram of a galvanoscanner according to a second embodiment.
Figure 8:
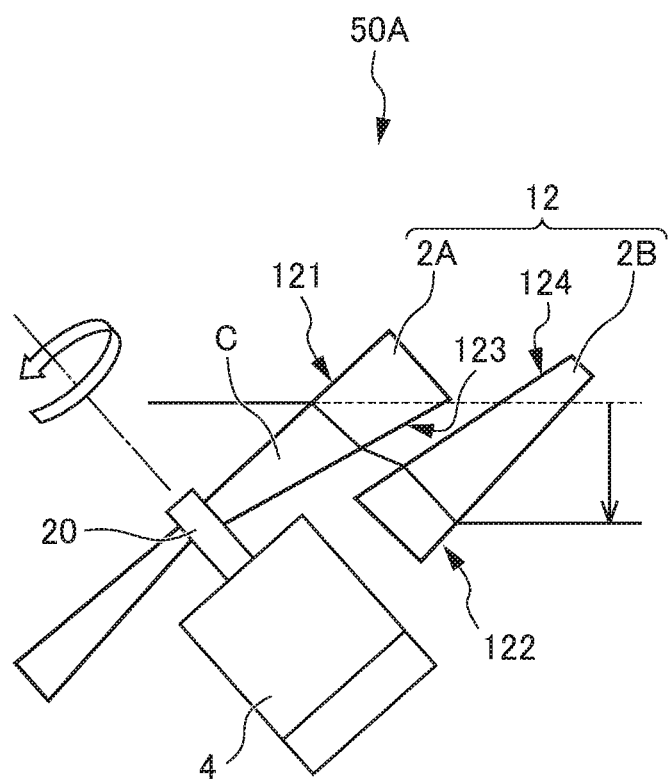
FIG. 8 is a view showing an optical component of the galvanoscanner according to the second embodiment.

FIG. 7 is a functional block diagram of a galvanoscanner 50A according to a second embodiment. FIG. 8 is a view showing an optical component group 12 of the galvanoscanner 50A according to the second embodiment. As shown in FIGS. 7 and 8, the galvanoscanner 50A according to the present embodiment, compared to the galvanoscanner 50 according to the first embodiment, is the same configuration as the first embodiment except of changing the optical component 2 to the optical component group 12 consisting of a plurality of optical components.

More specifically, the present embodiment includes the optical component group 12 consisting of an optical component 2A and optical component 2B. The optical component 2A, compared to the optical component 2 of the first embodiment, is the same configuration as the optical component 2, except for differing in the point of the incident side 121 and emission side 123 not being parallel to each other. On the other hand, the optical component 2B greatly differs from the optical component 2 of the first embodiment, and only shares the point of being configured by an optical component having a different refractive index from the surroundings. In more detail, this optical component 2B is not rotatable, and is arranged to be fixed, and thus the incident side 124 and emission side 122 thereof are not parallel to each other.

It should be noted that, as shown in FIGS. 7 and 8, an initial first incident side 121 of the cross-section C in the thickness T direction and the final emission side 122 of the optical component group 12 are parallel to each other. In other words, the incident side 121 of the optical component 2A and the emission side 122 of the optical component 2B are parallel to each other. In addition, the emission side 123 of the optical component 2A and the incident side 124 of the optical component 2B are parallel to each other.

According to the present embodiment, similar effects as the first embodiment are exerted. Additionally, according to the present embodiment, the shape of the optical component can be simplified.

(Third Embodiment)

Figure 9:
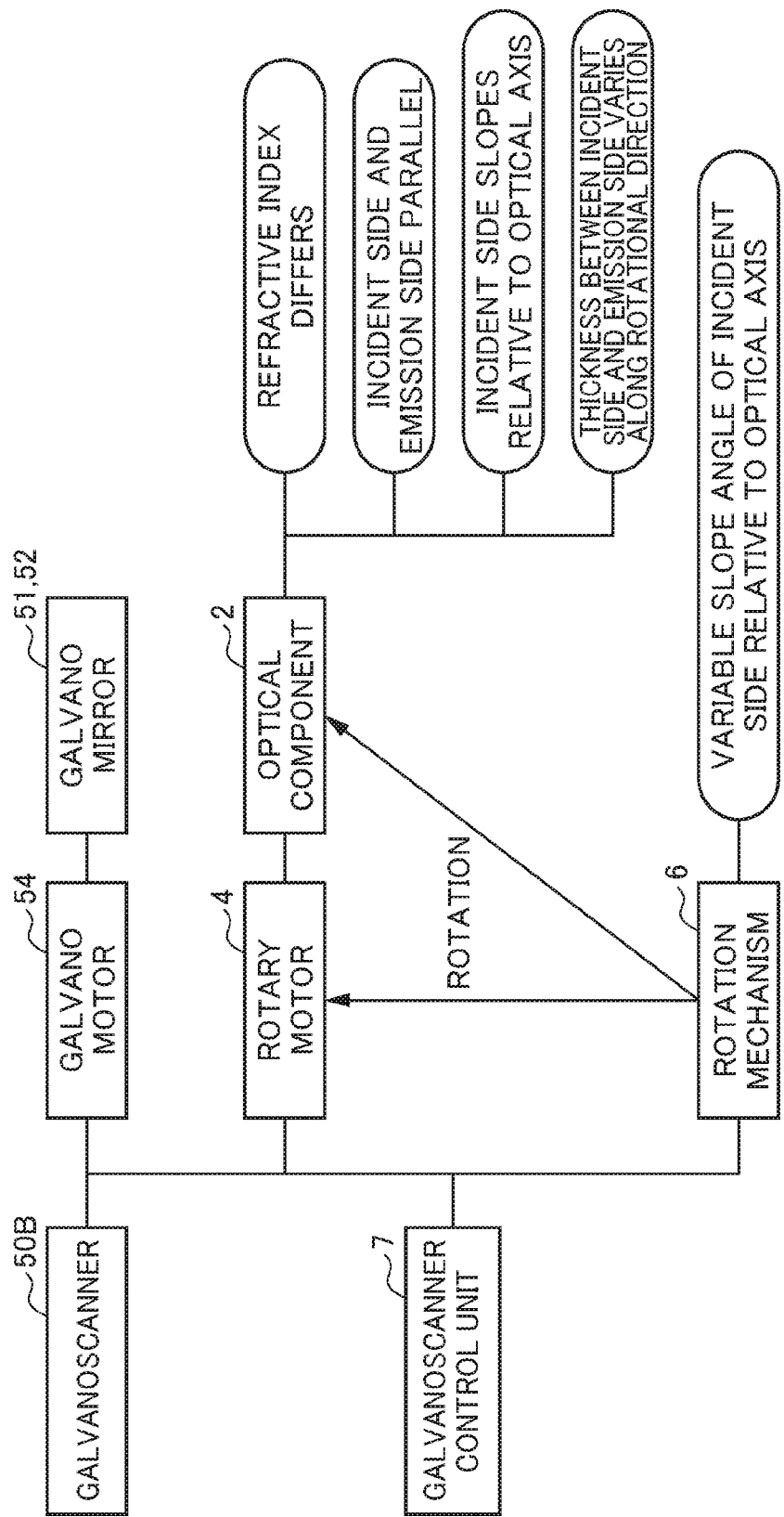
FIG. 9 is a functional block diagram of a galvanoscanner according to a third embodiment.
Figure 10:
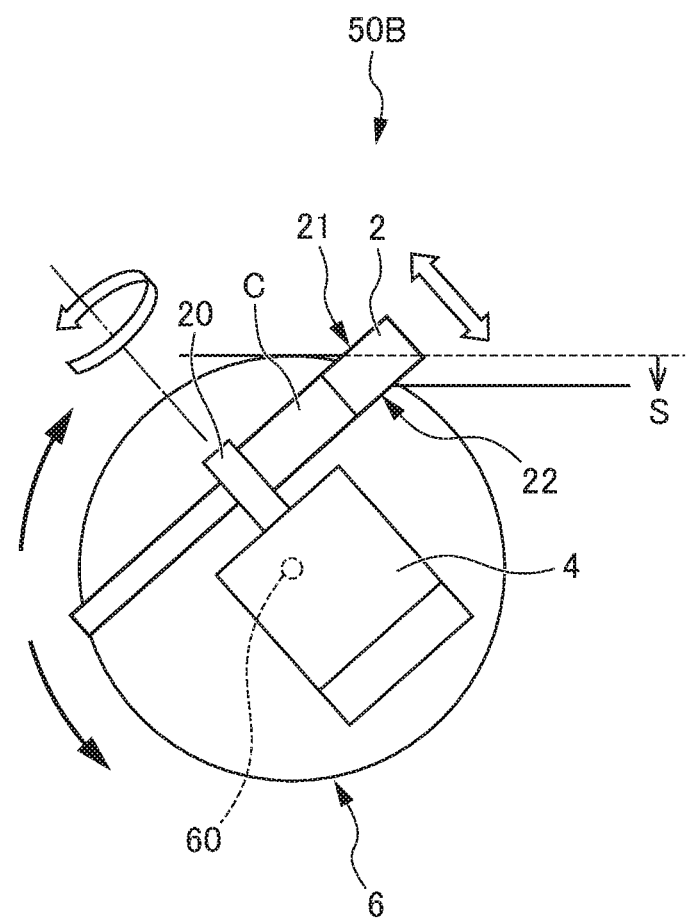
FIG. 10 is a view showing an optical component and rotation mechanism of the galvanoscanner according to the third embodiment.

FIG. 9 is a functional block diagram of a galvanoscanner 50B according to a third embodiment. FIG. 10 is a view showing an optical component 2B and rotation mechanism 6 of the galvanoscanner 50B according to the third embodiment. As shown in FIGS. 9 and 10, the galvanoscanner 50B according to the present embodiment, compared to the galvanoscanner 50 according to the first embodiment, is the same configuration as the first embodiment except for differing in the point of including the rotation mechanism 6.

The rotation mechanism 6, as shown in FIG. 10, causes the optical component 2 and rotary motor 4 to rotate as a single body around a rotating shaft 60 which is perpendicular to a plane (plane of page in FIG. 10) including the rotating shaft 20 of the optical component 2 as well as including the optical axis L1 of the laser beam L. More specifically, this rotation mechanism 6 includes a rotation mechanism motor (not illustrated) consisting of a servomotor, for example, and thereby causes the optical component 2 and rotary motor 4 to integrally rotate around the rotating shaft 60.

According to the present embodiment, similar effects as the first embodiment are exerted. Additionally, according to the present embodiment, by causing the optical component 2 and rotary motor 4 to rotate as a single body around the aforementioned rotating shaft 60, it is possible to change the slope angles of the incident side 21 and emission side 22 relative to the optical axis L1 of the incident laser beam L, and it is possible to change the shift amount S of the beam position of the laser beam L, i.e. the amplitude of the oscillation of the laser beam L.

(Fourth Embodiment)

Figure 11:
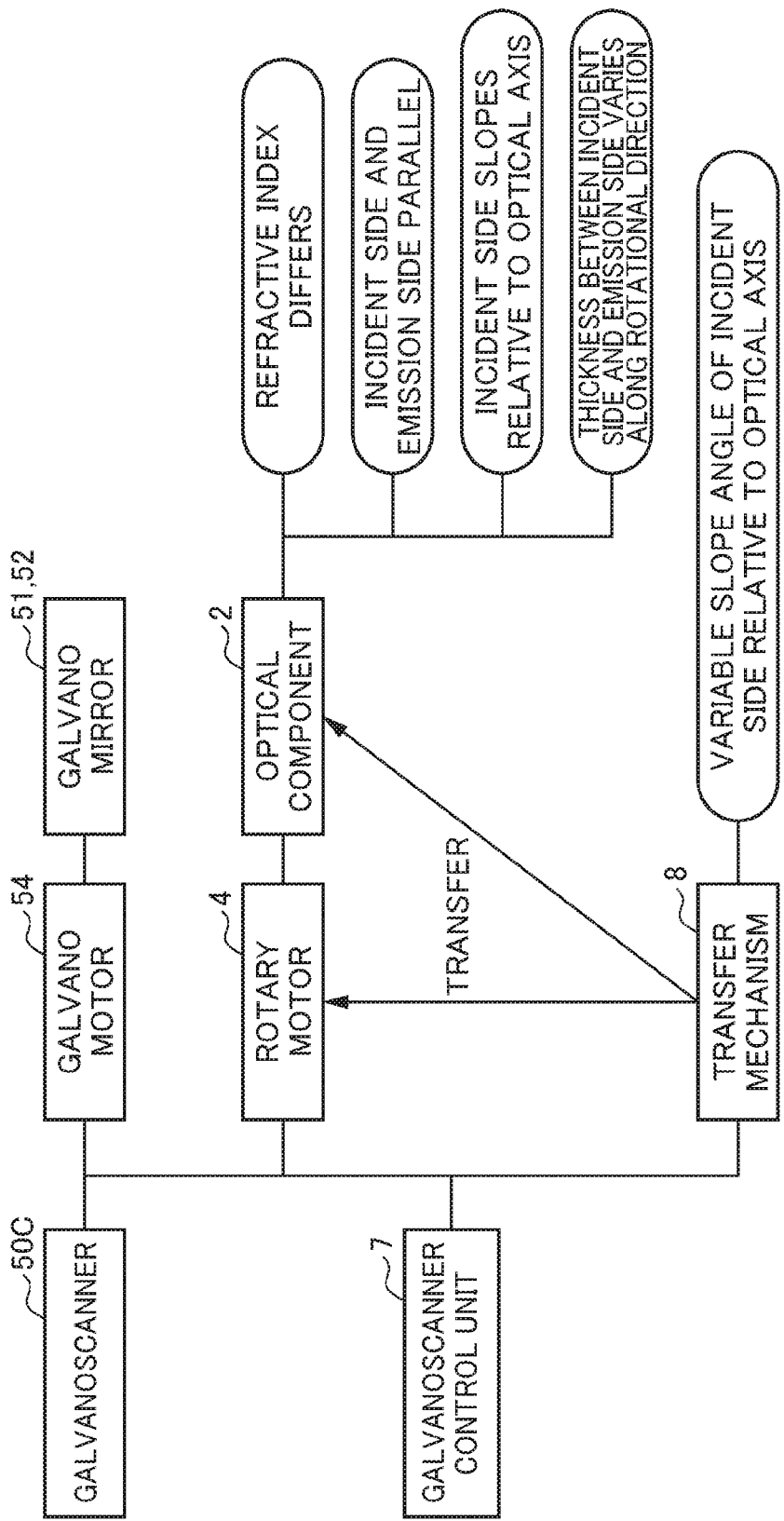
FIG. 11 is a functional block diagram of a galvanoscanner according to a fourth embodiment.
Figure 12:
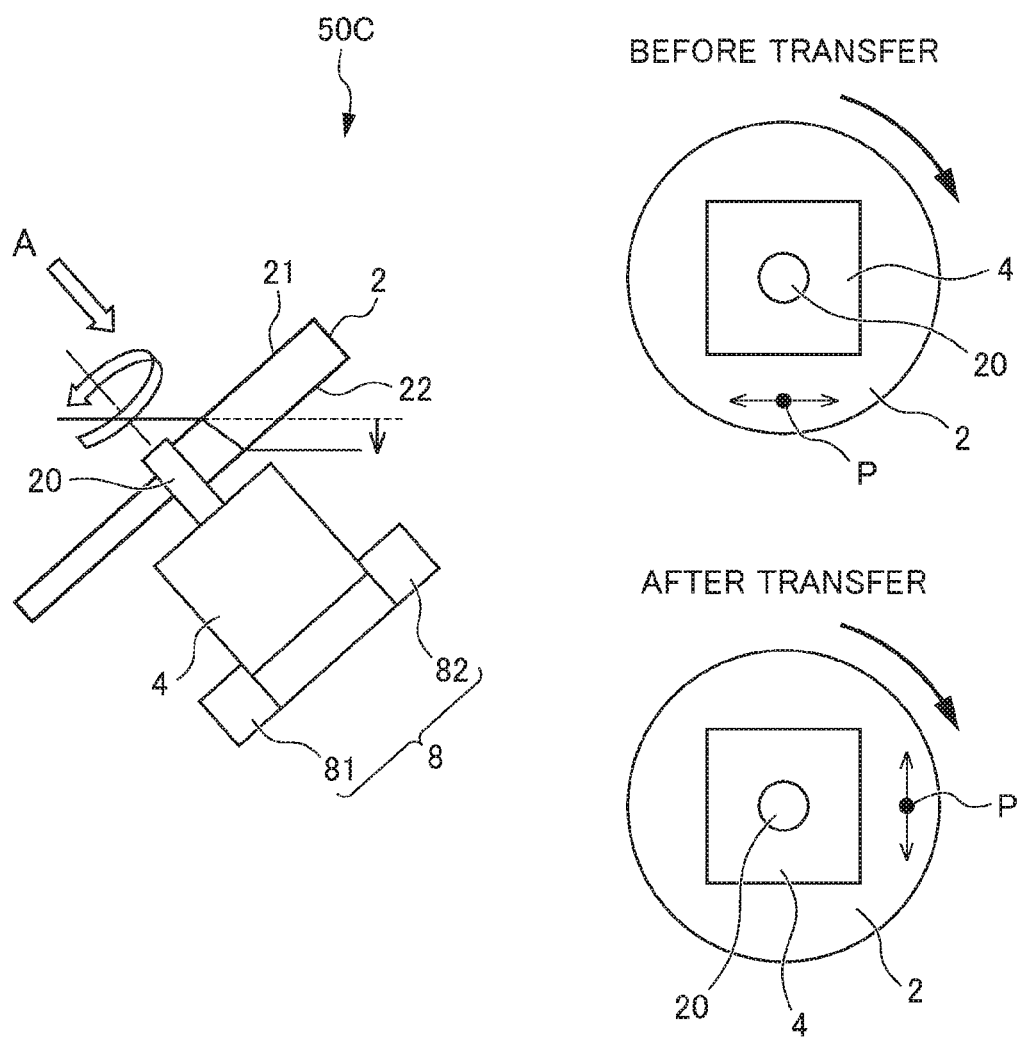
FIG. 12 is a view showing an optical component and rotation mechanism of the galvanoscanner according to the fourth embodiment.

FIG. 11 is a functional block diagram of a galvanoscanner 50C according to a fourth embodiment. FIG. 12 is a view showing an optical component 2 and transfer mechanism of the galvanoscanner 50C according to the fourth embodiment. It should be noted that FIG. 12 shows views along the arrow A both before and after transfer of the optical component 2 and rotary motor 4. As shown in FIGS. 11 and 12, the galvanoscanner 50C according to the present embodiment, compared to the galvanoscanner 50 according to the first embodiment, is the same configuration as the first embodiment except for differing in the point of including a transfer mechanism 8.

The transfer mechanism 8, as shown in FIG. 12, causes the optical component 2 and rotary motor 4 to move as a single body in the direction of a plane (face perpendicular to plane of page in FIG. 12) that is perpendicular to the rotating shaft 20 of the optical component 2. More specifically, this transfer mechanism 8, as shown in FIG. 12, for example, includes slide mechanisms 81, 82 capable of sliding the optical component 2 and rotary motor 4 in a direction orthogonal to each other in the aforementioned planar direction, and a servomotor (not illustrated) that drives these.

According to the present embodiment, similar effects as the first embodiment are exerted. Additionally, according to the present embodiment, by moving the optical component 2 and the rotary motor 4 as a single body in the planar direction perpendicular to the rotating shaft 20 of the optical component 2, it is possible to change the incident position P of the laser beam L relative to the optical component 2 (i.e. angular position on the polar coordinates centered on the rotating shaft 20), and thus possible to change the amplitude direction of the oscillation of the laser beam L.

(Fifth Embodiment)

Figure 13:
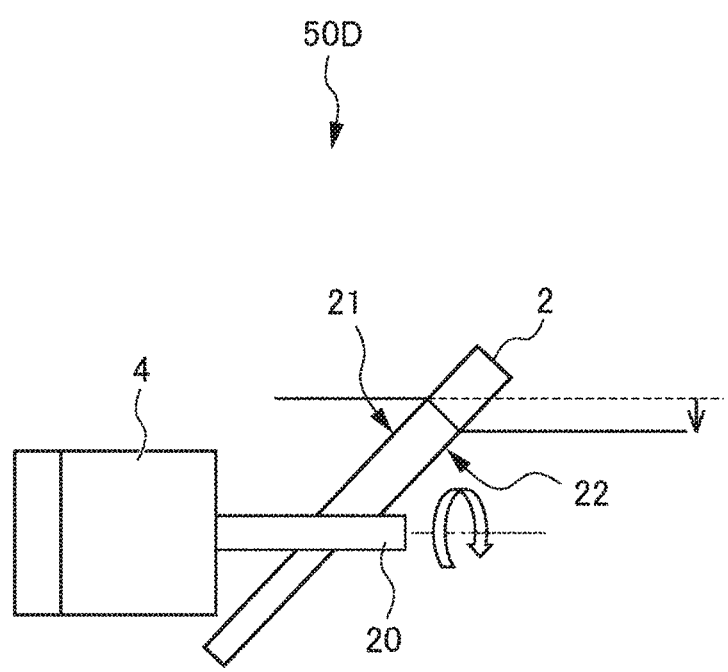
FIG. 13 is a view showing an optical component of a galvanoscanner according to a fifth embodiment.

FIG. 13 is a view showing an optical component 2 of a galvanoscanner 50D according to a fifth embodiment. As shown in FIG. 13, the galvanoscanner 50D according to the present embodiment, compared to the galvanoscanner 50 according to the first embodiment, is the same configuration as the first embodiment, except for differing in the arrangement of the optical component 2 and rotary motor 4.

More specifically, in the present embodiment, the rotary motor 4 is arranged parallel to the optical axis L1 of the laser beam L, while the optical component 2 is arranged obliquely to the optical axis L1 of the laser beam L. In this way, the arrangement of the rotary motor 4 has freedom, so long as the optical component 2 is arranged obliquely to the optical axis L1 of the laser beam L. Therefore, according to the present embodiment, similar effects as the first embodiment are exerted.

It should be noted that the present invention is not to be limited to each of the aforementioned embodiments, and that modifications and improvements within a scope capable of achieving the objects of the present invention are also encompassed by the present invention. In each of the aforementioned embodiments, an automobile body is used as the workpiece W; however, it is not limited thereto, and it is possible to use various other workpieces. In addition, in each of the aforementioned embodiments, a galvanoscanner equipped with two galvano mirrors is used; however, it is not limited thereto, and it is possible to use a galvanoscanner equipped with one, three or more galvano mirrors.

EXPLANATION OF REFERENCE NUMERALS 1 remote laser welding system
2, 2A, 2B optical component
4 rotary motor
6 rotation mechanism
8 transfer mechanism
12 optical component group
20 rotating shaft
21 incident side (region of incident side)
22 emission side (region of emission side)
50, 50A, 50B, 50C, 50D galvanoscanner
51, 52 galvano mirror
54 galvano motor
121 first incident side (region of first incident side)
122 final emission side (region of final emission side)
C cross section
L laser beam
L1 optical axis
P incident position
T thickness
W workpiece

What is claimed is:

1. A galvanoscanner that scans a laser beam, comprising:
   at least one galvano mirror that is configured to be rotatable about a rotation axis, and reflects a laser beam;
   a galvano motor that rotationally drives the galvano mirror;
   an optical component that is arranged so that the laser beam incident on the galvano mirror is incident in a thickness direction, is configured to be rotatable about a rotation axis, and has a refractive index that differs from a surrounding; and a rotary motor that rotationally drives the optical component, wherein the optical component is a ring shape having a hole in the center thereof, a rotating shaft of the rotary motor being inserted into the hole to be fixed, and is arranged so that, in a cross section in a thickness direction along the radial direction of the optical component, a region on an incident side and a region on an emission side are parallel to each other, and the region on the incident side is sloped relative to an optical axis of the laser beam that is incident, and thickness thereof continuously varies along a rotation direction.

2. The galvanoscanner according to claim 1, wherein the optical component is configured by an optical component group consisting of a plurality of optical components containing at least one optical component which is a ring shape having a hole in the center, in which a rotating shaft of the rotary motor is inserted in the hole to be fixed, and having a thickness that continuously varies along the rotation direction, and configured to be rotatable about a rotating shaft by way of the rotary motor, and wherein the optical component group has, in a cross section in the thickness direction along the radial direction of the optical component, a region of an initial incident side and a region of a final emission side that are parallel to each other.

3. The galvanoscanner according to claim 1, further comprising a rotation mechanism establishing as variable a slope angle of the region of the incident side and the region of the emission side relative to the optical axis of the laser beam that is incident, by causing the optical component and the rotary motor to rotate integrally, about a rotating shaft perpendicular relative to a plane including the rotation axis of the optical component as well as including the optical axis of the laser beam.

4. The galvanoscanner according to claim 2, further comprising a rotation mechanism establishing as variable a slope angle of the region of the incident side and the region of the emission side relative to the optical axis of the laser beam that is incident, by causing the optical component and the rotary motor to rotate integrally, about a rotating shaft perpendicular relative to a plane including the rotation axis of the optical component as well as including the optical axis of the laser beam.

5. The galvanoscanner according to claim 1, further comprising a transfer mechanism establishing an incident position of the laser beam as variable relative to the optical component, by causing the optical component and the rotary motor to move integrally, in a planar direction perpendicular to the rotation axis of the optical component.

6. The galvanoscanner according to claim 2, further comprising a transfer mechanism establishing an incident position of the laser beam as variable relative to the optical component, by causing the optical component and the rotary motor to move integrally, in a planar direction perpendicular to the rotation axis of the optical component.

7. The galvanoscanner according to claim 3, further comprising a transfer mechanism establishing an incident position of the laser beam as variable relative to the optical component, by causing the optical component and the rotary motor to move integrally, in a planar direction perpendicular to the rotation axis of the optical component.

8. The galvanoscanner according to claim 4, further comprising a transfer mechanism establishing an incident position of the laser beam as variable relative to the optical component, by causing the optical component and the rotary motor to move integrally, in a planar direction perpendicular to the rotation axis of the optical component.

* * * * *